US011945187B2

(12) United States Patent
Goodrich

(10) Patent No.: US 11,945,187 B2
(45) Date of Patent: Apr. 2, 2024

(54) METHOD AND APPARATUS FOR DISPENSING AND EXPANDING EXPANDABLE SLIT SHEET MATERIAL

(71) Applicant: David Paul Goodrich, Sedona, AZ (US)

(72) Inventor: David Paul Goodrich, Sedona, AZ (US)

(73) Assignee: HexcelPack, LLC, Sedona, AZ (US)

( * ) Notice: Subject to any disclaimer, the term of this patent is extended or adjusted under 35 U.S.C. 154(b) by 630 days.

(21) Appl. No.: 16/397,503

(22) Filed: Apr. 29, 2019

(65) Prior Publication Data

US 2019/0248092 A1 Aug. 15, 2019

Related U.S. Application Data

(63) Continuation-in-part of application No. 16/290,016, filed on Mar. 1, 2019, now Pat. No. 11,479,009,
(Continued)

(51) Int. Cl.
*B65H 16/00* (2006.01)
*B31D 5/00* (2017.01)

(52) U.S. Cl.
CPC ......... *B31D 5/0065* (2013.01); *B65H 16/005* (2013.01); *B31D 2205/0023* (2013.01); *B31D 2205/0047* (2013.01)

(58) Field of Classification Search
CPC .......... B31D 5/0065; B31D 2205/0023; B31D 2205/0047; B65H 16/005; B65H 23/08;
(Continued)

(56) References Cited

U.S. PATENT DOCUMENTS 3,503,567 A * 3/1970 Casey .................... B65H 27/00 242/541.1
6,024,832 A 2/2000 Trani et al.
(Continued)

FOREIGN PATENT DOCUMENTS

CN 107921724 A 4/2018
GB 2069457 A 8/1981
(Continued)

OTHER PUBLICATIONS

Notification of Transmittal of The International Search Report and The Written Opinion of the International Seaching Authority, or the Declaration (Form PCT/ISA/220) issued in counterpart International Application No. PCT/US19/29684 dated Oct. 17, 2019 with Forms PCT/ISA/210 and PCT/ISA/237(10 pages).
(Continued)

*Primary Examiner* — Valentin Neacsu
*Assistant Examiner* — Mary C Hibbert-Copeland
(74) *Attorney, Agent, or Firm* — Studebaker Brackett PC

(57) ABSTRACT

A device for expanding and dispensing expandable slit sheet paper includes a pair of support members for a roll of expandable slit sheet paper. The roll of expandable slit sheet paper has an interior core member and a roll of expandable slit sheet paper wound on said interior core member. The interior core member has an axial length that is greater than the width of said slit sheet paper that is wound on said interior core member and has end regions that extend beyond the roll of expandable slit sheet paper. Pressure means is provided for pressing a first end region against its core support member and applying a frictional rotation resistance to the core member end region. The roll of expandable slit sheet paper is mounted on the device by positioning one end region under the pressure means and in a support relationship with its core support member while
(Continued)

the roll of expandable slit sheet paper is inclined with respect to the device. The other end region is then moved into its supported position with its core support member. An adjustable downward pressure is exerted on the paper core end region and causing the paper core end region to be pressed against its support member as the paper is pulled. The downward pressure creates the friction required to enable the unexpanded slit sheet to be unwind and fed while simultaneously expanding.

34 Claims, 7 Drawing Sheets

Related U.S. Application Data which is a continuation-in-part of application No. 15/820,514, filed on Nov. 22, 2017, now Pat. No. 11,220,395, and a continuation-in-part of application No. 15/428,144, filed on Feb. 8, 2017, now Pat. No. 11,608,222.

(60) Provisional application No. 62/664,698, filed on Apr. 30, 2018.

(58) Field of Classification Search
CPC .... B65H 23/063; B65D 65/22; B65D 85/672; D21H 5/245; D21H 5/24; D21H 27/10
USPC .......................................................... 53/449
See application file for complete search history.

(56) References Cited

U.S. PATENT DOCUMENTS

| | | | |
|---|---|---|---|
| 6,458,447 B1 | 10/2002 | Cabell et al. | |
| 2001/0034998 A1* | 11/2001 | Yamaai | B65D 19/20 53/409 |
| 2002/0060034 A1 | 5/2002 | Hollmark et al. | |
| 2007/0240841 A1 | 10/2007 | Trani et al. | |
| 2012/0223179 A1 | 9/2012 | Galindo Gonzalez et al. | |
| 2013/0240657 A1 | 9/2013 | Kuchar et al. | |
| 2014/0027553 A1 | 1/2014 | Page et al. | |
| 2015/0165717 A1* | 6/2015 | Page | B65H 23/06 242/594.6 |
| 2016/0130104 A1 | 5/2016 | Page et al. | |
| 2018/0222665 A1 | 8/2018 | Goodrich | |

FOREIGN PATENT DOCUMENTS

| | | |
|---|---|---|
| JP | H05-008483 A | 1/1993 |
| JP | H06-210918 A | 8/1994 |
| JP | 2010-254367 A | 11/2010 |
| WO | 2017/074535 A1 | 5/2017 |

OTHER PUBLICATIONS

First Examination Report issued in IN 202017047236; mailed by the Intellectual Property India dated Jun. 1, 2022.

An Office Action mailed by China National Intellectual Property Administration dated Jan. 6, 2022, which corresponds to Chinese Patent Application No. 201980043174.7; with English language translation (23 pages).

The extended European search report issued by the European Patent Office dated Jan. 4, 2022, which corresponds to European Patent Application No. 19795837.4-1017 (9 pages).

Office Action dated Oct. 26, 2021, issued in counterpart JP Application No. 2021-509726, with English Translation. (8 pages).

A Notice of Reasons for Refusal issued by the Japanese Patent Office dated Aug. 23, 2022, which corresponds to Japanese Patent Application No. 2021-509726 and is related to U.S. Appl. No. 16/397,503.

* cited by examiner

METHOD AND APPARATUS FOR DISPENSING AND EXPANDING EXPANDABLE SLIT SHEET MATERIAL

CROSS-REFERENCE TO RELATED PATENT APPLICATIONS

Further information relating to the paper which can be used in the present invention, slit patterns, and the expansion process is found in U.S. Pat. Nos. 5,538,778; 5,667,871; 5,688,578; and 5,782,735; 3,908,071; Ser. No. 14/901,977; WO1984002936A1; US20020060034; US 2007/0240841 A1; U.S. Pat. Nos. 3,104,197; 3,220,116; 3,266,972; 3,269,393; 3,908,071; 6,024,832; 6,458,447 B1; and 6,712,930 B2; the disclosures of which are incorporated by reference herein, as though recited in full.

PRIORITY DATA AS CLAIMED BY APPLICANT

This application claims the benefit of provisional application 62/664,698 filed Apr. 30, 2018 the disclosure of which is incorporated by reference herein, as though recited in full.

This application is a CIP of Ser. No. 15/428,144 filed, Feb. 8, 2017, publication No. US 2018/0222665, a CIP of Ser. No. 15/820,514 filed Nov. 22, 2017, publication No. US 2018-0127197-A1, and a CIP of Ser. No. 16/290,016 filed Mar. 1, 2019, the disclosures of which are incorporated by reference herein, as though recited in full.

BACKGROUND OF THE INVENTION

Field of the Invention

This invention relates to the use of a tensioning device that fits onto a bar and yoke for dispensing expanded slit sheet material.

Description of the Prior Art

There have been a number of devices to dispense expanded slit sheet material that are motorized for powered dispensing and manual devices that must provide a tensioning method. For example, Geami WrapPak® ExBox is a self-contained, disposable, and recyclable combination of die cut kraft paper and tissue interleaf that in combination is used to cushion and protect fragile items during shipment.

DESCRIPTION OF THE PREFERRED EMBODIMENTS

Summary of the Invention

The preferred embodiments overcome problems in the above and/or other background art.

Another notable object of some preferred embodiments of the present invention is to create a lightweight expanded slit sheet made from paper using a paper dispenser that provides for the expansion of a slit sheet of paper.

In accordance with a broad embodiment of the invention, provides a dispenser for expanding slit paper in which a roll of slit sheet material can be installed without removing any parts during each roll change.

In accordance with an embodiment of the invention, a device is provided for expanding and dispensing expandable slit sheet paper. The device comprises:

a roll of expandable slit sheet paper, the a roll of expandable slit sheet paper having:

an interior core member that is preferably hollow, a roll of expandable slit sheet paper is wound on the interior core member, the interior core member having an axial length that is greater than the width of the slit sheet paper that is wound on the interior core member and having at least a first interior core member end region that extends beyond the roll of expandable slit sheet paper, and an expanding and dispensing apparatus, the apparatus having:

a first core support member, a second core support member, first means for pressing the first interior core member end region against the first core support member and second means for variably applying a frictional rotation resistance to the first interior core member end region. A first end region of the interior core member is mounted on the first core support member, and a second end region of the interior core member mounted on the second support member.

In accordance with another embodiment of the invention an expanding and dispensing apparatus has a first core support member. A roll of expandable slit sheet paper has an interior core member and a roll of expandable slit sheet paper wound on the interior core member. The interior core member has an axial length that is greater than the width of the slit sheet paper and has a first interior core member end region that extends beyond the roll of expandable slit sheet paper. The first core support member is attached to a first side wall member and is positioned internally of the first end region of the first interior core member. The interior core member is preferably hollow. A rotational resistance member can be supported by the first side wall member and extend from the first side wall member to a position in which it contacts the surface of the first interior core member end region that extends beyond the roll of expandable slit sheet paper.

In accordance with another embodiment of the invention an expanding and dispensing apparatus has a first core support member. A roll of expandable slit sheet paper has an interior core member and a roll of expandable slit sheet paper wound on the interior core member. The interior core member has an axial length that is greater than the width of the slit sheet paper and has a first interior core member end region that extends beyond the roll of expandable slit sheet paper. The first core support member is attached to a first side wall member and is positioned externally of the first end region of the first interior core member. A rotational resistance member is advantageously supported by the first side wall member and extends from the first side wall member to a position in which it contacts the surface of the first interior core member end region that extends beyond the roll of expandable slit sheet paper. Preferably the first core support member has a first surface in contact with the surface of the first interior core member end region and has an arcuate configuration.

Advantageously, the arcuate configuration has a curvature that cooperates with the curvature of the outer surface of the first interior core member end region. The first core support member first surface has a radius greater than the radius of the first interior core member an arc of less than 240° in order to enable the tension rod to contact the first interior core member. Preferably, the arcuate configuration has an arc of at least 180°.

In accordance with another embodiment of the invention an expanding and dispensing apparatus has a first core support member and a second core support member. A roll of expandable slit sheet paper has an interior core member and a roll of expandable slit sheet paper wound on the interior core member. The interior core member has an axial length that is greater than the width of the slit sheet paper and has a first interior core member end region and a second interior core member end region that extends beyond the roll of expandable slit sheet paper. The first core support member is attached to a first side wall member and is positioned externally of the first end region of the first interior core member. A rotational resistance member is advantageously supported by the first side wall member and extends from the first side wall member to a position in which it contacts the surface of the first interior core member end region that extends beyond the roll of expandable slit sheet paper. Preferably the first core support member has a first surface in contact with the surface of the first interior core member end region and has an arcuate configuration. Advantageously, the arcuate configuration has a curvature that cooperates with the curvature of the outer surface of the first interior core member end region. The first core support member first surface has a radius greater than the radius of the first interior core member and an arc that provides an open region that is sufficient for a friction means to contact the first interior core member end region. The radius of the first core support member is sufficiently greater than the radius of the first interior core member in order to enable the first interior core member to be inserted into the first core support member. Further the arc is less than about 300° and preferably no greater than 240° in order to enable the tension rod to contact the first interior core member and to facilitate loading of the slit sheet material on the expander-dispensing apparatus. Preferably the second core support member has a first surface in contact with the surface of the second interior core member end region and has an arcuate or circular configuration. Advantageously, the arcuate configuration has a curvature that cooperates with the curvature of the outer surface of the second interior core member end region. The second core support member first surface has a radius greater than the radius of the second interior core member and an arc of less than 180°. Preferably, the arcuate configuration has an arc of between 180° and 110°. In embodiments in which the second core support member has an arcuate configuration of no greater than about 180°, the second interior core member can be lifted off the second core support member and the roll of expandable slit sheet paper rotated about the first core support member and separated from the expanding and dispensing apparatus. Conversely, the roll of expandable slit sheet paper rotated about the first core support member and separated from the expanding and dispensing apparatus by inserting the first interior core member into the first core support member, the roll of expandable slit sheet paper is rotated about the first core support member and the second interior core member is positioned on the second core support member. When second interior core member is positioned on the second core support member it is in contact with and resting upon the second interior core member.

In accordance with a further embodiment of the invention an expanding and dispensing apparatus is provided with friction means for variably applying a frictional resistance to the rotation of the core member. The apparatus includes a first wall member and a first core support member fixed to the first wall member. The core support member supports the end region of an interior core member of a roll of expandable slit sheet paper wound on the interior core member. The end of the interior core member extends axially beyond the roll of expandable slit paper. The friction means can variably applying a frictional resistance to the rotation of the interior core member by applying a variable pressure to the surface of the end region of the interior core member. The first wall member is preferably sheet metal, and most preferably, aluminum or steel. A second wall member is preferably sheet metal, and most preferably, steel. The first and second wall members can be secured together, in a spaced relationship, by a plurality of bars or rods. Preferably the interior core member extends beyond the width of the roll of slit sheet paper, an amount of at least one inch from the roll of slit sheet paper. Most preferably, both end regions of the interior core member extend beyond the width of the roll of slit sheet paper, by an amount of at least one inch. Advantageously, both end regions of the interior core member extend beyond the width of the roll of slit sheet paper, by an amount at least about one and one half inches from the roll of slit sheet paper.

In accordance with another embodiment of the invention, a device is provided for expanding and dispensing expandable slit sheet paper. The device includes a roll of expandable slit sheet paper that has an interior core member and a roll of expandable slit sheet paper wound on the interior core member. The interior core member has an axial length that is greater than the width of the slit sheet paper that is wound on the interior core member and has at least a first interior core member end region that extends beyond the roll of expandable slit sheet paper. The device further includes an expanding and dispensing apparatus having a first core support member, a second core support member, first means for pressing the first interior core member end region against the first core support member and second means for variably applying a frictional rotation resistance to the first interior core member end region. A first end region of the interior core member is mounted on the first core support member. The expanding and dispensing apparatus can have a second end region of the interior core member mounted on a second support member.

In accordance with another embodiment of the invention an expanding and dispensing apparatus has a first core support member and a roll of expandable slit sheet paper having an interior core member and a roll of expandable slit sheet paper wound on the interior core member. The interior core member has an axial length that is greater than the width of the slit sheet paper and has a first interior core member end region that extends beyond the roll of expandable slit sheet paper. The first core support member is attached to a first side wall member and is positioned externally of the first end region of the first interior core member and at least partially encompassing the first interior core member end region. A tensioning member applies a force against the first end region of the first interior core member and presses the first end region of the first interior core member against the first core support member.

In accordance with a further embodiment of the invention in the means for variably applying a frictional resistance to the rotation of the core member is fixed to a first wall member. A first core support member is fixed to the first wall member and an elongated member is hingedly coupled to the first wall member.

In accordance with a still another embodiment of the present invention the invention comprises a method of mounting a roll of expandable slit sheet paper on an apparatus for expanding and dispensing expanded slit sheet paper, wherein the expanding and dispensing apparatus has a first core support member attached to a first side wall member and a second side wall member. A roll of expandable slit sheet paper has an interior core member and a roll of expandable slit sheet paper wound on the interior core member. The interior core member has an axial length that is greater than the width of the slit sheet paper and has a first interior core member end region that extends beyond the roll of expandable slit sheet paper. The first core support member is positioned internally of the first interior core member end region of the first interior core member by bringing the first interior core member end region into contact with the first core support member, inserting the first core support member into the first interior core member first interior core member end region while a second interior core member end region that extends beyond the roll of expandable slit sheet paper is rotated about the first core support member and into contact with and resting upon a second core support member region in the second side wall member.

In accordance with a still further embodiment of the present invention the invention comprises a method of mounting a roll of expandable slit sheet paper on an apparatus for expanding and dispensing expanded slit sheet paper. The expanding and dispensing apparatus has a first core support member attached to a first side wall member and a second side wall member attached to the first side wall member. A roll of expandable slit sheet paper has an interior core member and a roll of expandable slit sheet paper wound on the interior core member. The interior core member has an axial length that is greater than the width of the slit sheet paper and has a first interior core member end region and a second interior core member end region, each of which extends beyond the roll of expandable slit sheet paper. The first core support member is positioned externally of the first interior core member end region of the first interior core member by bringing the first interior core member end region into contact with the first core support member and inserting the first interior core member first interior core member end region into the first core support member and resting upon the first core support member of the first side wall member while the second interior core member end region is rotated about said first core support member from a position spaced from the second core support member and into contact with and resting upon the second core support member of the second side wall member.

In accordance with a still another embodiment of the present invention the invention comprises a method of mounting a roll of expandable slit sheet paper on an apparatus for expanding and dispensing expanded slit sheet paper, wherein the expanding and dispensing apparatus has a first core support member attached to a first side wall member and a second side wall member. A roll of expandable slit sheet paper has an interior core member and a roll of expandable slit sheet paper wound on the interior core member. The interior core member has an axial length that is greater than the width of the slit sheet paper and has a first interior core member end region and a second interior core member end region that extend beyond the roll of expandable slit sheet paper. The apparatus includes an elongated frictional resistance member hingedly coupled to a side wall support member. The first interior core member end region of the first interior core member is positioned in a supporting relationship with the first core support member of the attached to a first side wall member by bringing the first interior core member end region under the elongated frictional resistance member and into supported contact with the first core support member while the second interior core member end region is rotated into contact with and resting upon a second core support member region in the second side wall member. Dispensing the slit sheet paper by drawing the slit sheet paper against the resistance of the elongated frictional resistance member, and expanding the expandable slit sheet paper.

BRIEF DESCRIPTION OF DRAWINGS

The preferred embodiments of the present invention are described by a way of example, and not limitation, in relation to the accompanying Figures, in which.

DEFINITIONS RELATING TO THE PREFERRED EMBODIMENTS

Figure 1:
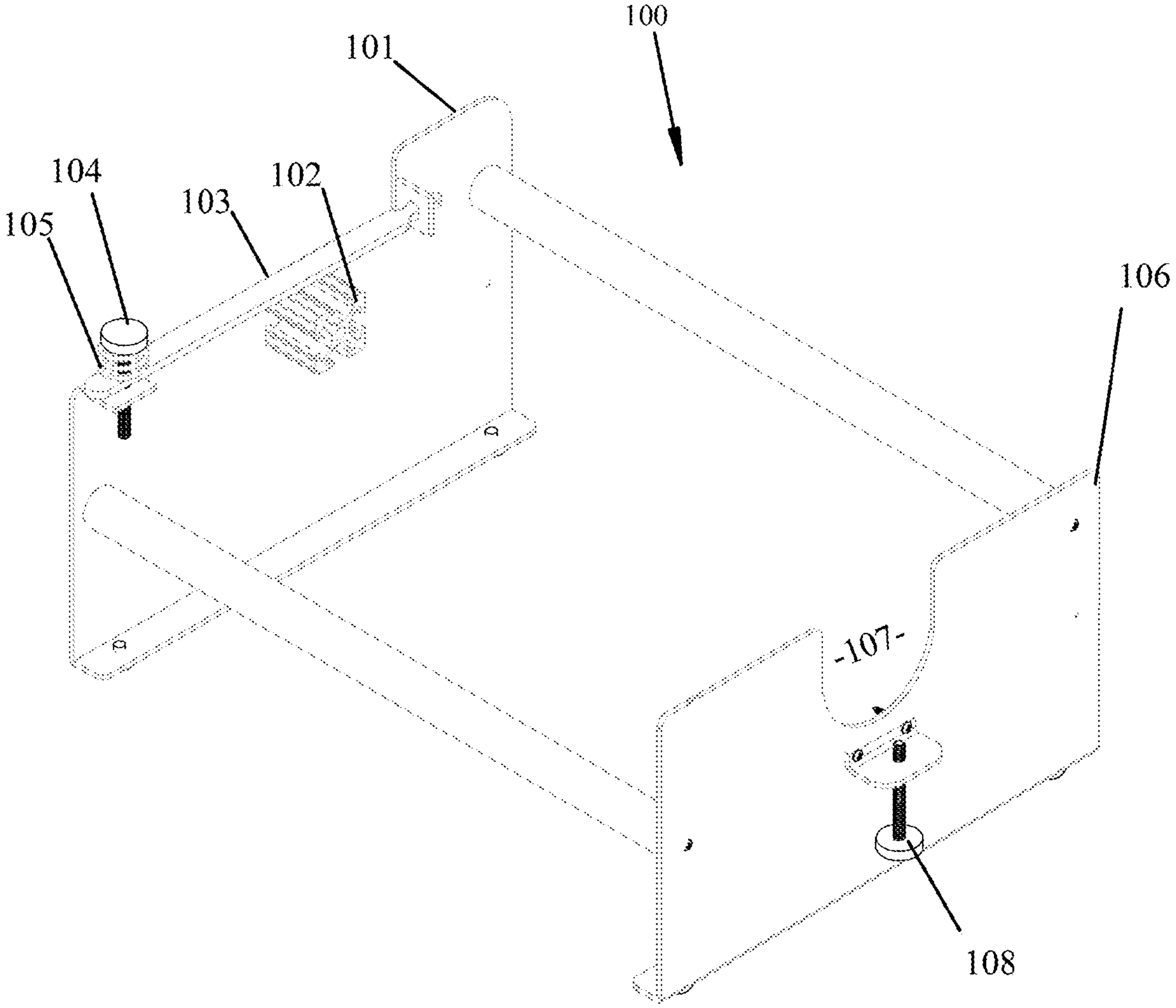
FIG. 1 is a perspective view of the dispensing and expanding apparatus and the tensioning device.

For the purposes of the present invention the term “paper roll” describes the slit sheet material wound around a paper core that is wider than the slit sheet material.

For the purposes of the present invention, the term “hingedly coupled” means a structure such as a piece of metal that is fastened to another structure such that its end opposite to its hinged end, is enabled to move between varying degrees of positions and is inclusive of a cantilevered member that is sufficiently flexible for its unsupported end to move between varying degrees of positions.

For the purposes of the present invention, the term “yoke” means a structure contoured or shaped to carry a load.

For the purposes of the present invention, the term “rod” means an a straight piece (as metal) that is longer than it is wide and is sufficiently rigid to span an opening such as in a yoke and function as a lever for applying a force against the outer surface of the exterior section of the interior core of a roll of expandable slit paper. The term “rod” is inclusive of a slender bar, a pole, rod, shaft, strut, and a beam.

For the purposes of the present invention, the term “core support member” means a structure that contacts the exterior end of a core member and bears the weight of a roll of paper that is wound around the core member by having the weight borne from below or interior of a hollow core member.

For the purposes of the present invention, the term “paper core” means the round paper tube around which the expandable slit sheet paper is wound.

For the purposes of the present invention, the term “curvature” means an essentially circular or arcuate configuration that is shaped or curved like an arc or bow.

For the purposes of the present invention, the term "tensioning mechanism" means a pressure assembly that applies pressure to an exterior end of a paper core to variably increase or decree friction.

For the purposes of the present invention, the term "attached" means securely fixing one part to another as in the art of assembling wood, wood composites, metals, or plastics in order to create a bolted, screwed, secured, fastened, or sealed assembly and is inclusive of permanent assemblies and configurations that can be disassembled.

For the purposes of the present invention, the term "extend beyond the ends of the paper roll" means the ends of an elongated core member that protrude beyond the ends of the paper roll.

For the purposes of the present invention, the term "horizontal" means parallel to the plane of the horizon.

For the purposes of the present invention, the term "inclined means forming an angle with respect to a horizontal plane, due to its slope or tilt.

For the purposes of the present invention, the term "biased' means a steady weight factor applied to a roll of expandable slit paper to cause it to lean toward the tensioning mechanism first core member.

DETAILED DESCRIPTION OF THE PREFERRED EMBODIMENTS

A purpose of the design of the present invention is to eliminate the loss of these parts due to their constant removal and the labor savings associated with their removal and reattachment The tensioning device in its preferred embodiment is to be made from aluminum but, can be made from wood and steel. The tensioning device and specifically the tension rod, spring and thumbscrew are of the same design as found in nonprovisional patent Ser. No. 15/428,144, (publication, US 2018/0222665, the disclosure of which is incorporated by reference herein, as though recited in full). The new art utilizes a short bar on the tensioning side and a yoke on the opposite side. This combination enables the paper to be loaded without the need for removing the tensioning rod, thumbscrew, and spring.

Figure 2:
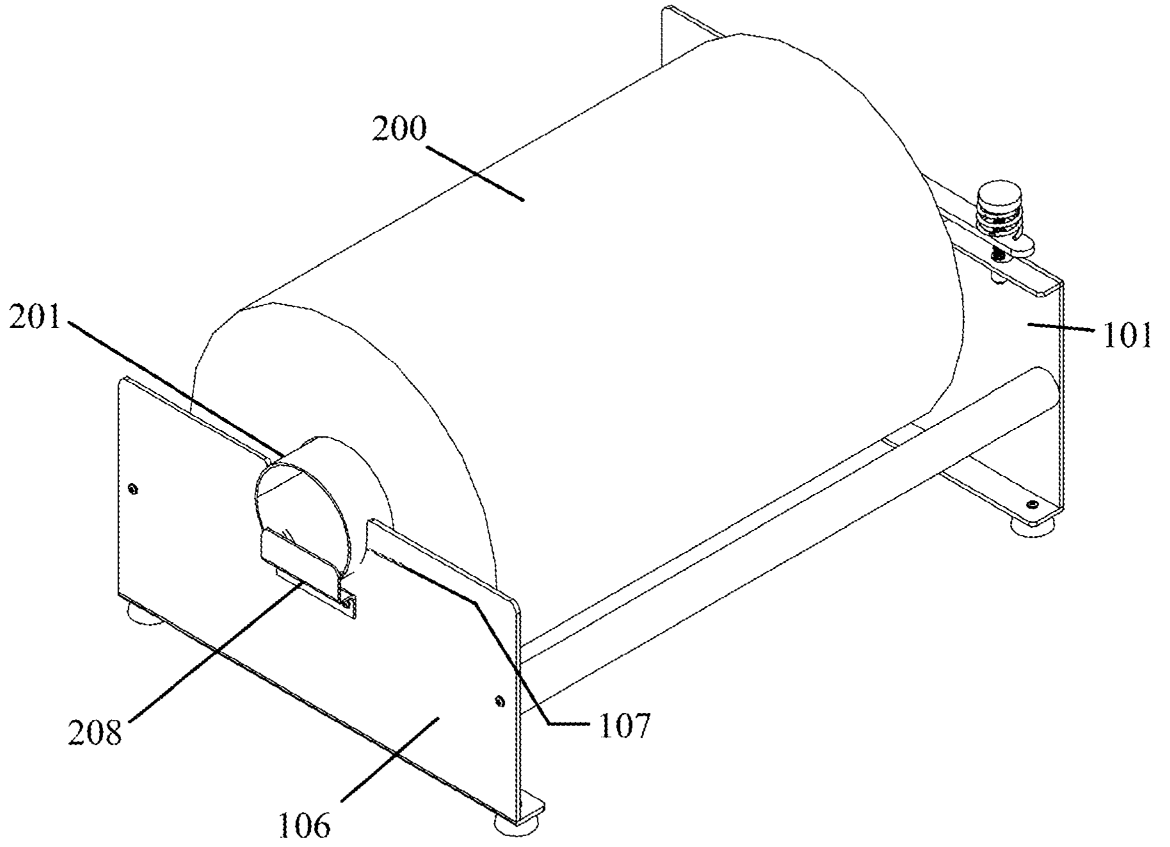
FIG. 2 is a perspective view of the dispensing and expanding apparatus, the tensioning device, and the paper roll loaded on the dispensing and expanding apparatus.

FIG. 1 is a perspective view of the entire tensioning assembly and dispensing structure 100 without the roll of expandable slit paper. The tensioning assembly is mounted on side fixture 101. The tensioning assembly includes a tension member 103, thumbscrew 104, and spring 105. The tension member 103 can be in the form of a rod or bar. The tensioning assembly applies tension, that is, rotational resistance, to the paper core, 204 (shown in FIG. 5) by pressing the core end region 203 (as shown inf FIGS. 3 and 4) against core support 102 that is in the form of a support bar that is fixed, that is, attached to fixture 101. The side fixture 106 provides support for the interior core end region Tensioning assemblies 103,104 and 105 of FIG. 1 are of the same basic design as disclosed in U.S. nonprovisional patent application Ser. No. 15/428,144 (Publication No. 2018-0222665). On the opposite side from side fixture 101, the bottom of the yoke area 107 supports the paper core end region 201, as shown in FIG. 2. Thus, the paper core end region 201 rests in the yoke area 107 of the side fixture 106. After the paper is loaded, the paper core end region 201 can be held in place by a core positioning member 108 that holds back the paper roll 201 of FIG. 2, thus inhibiting the end core region 201 from sliding on the core support member 102.

Figure 3:
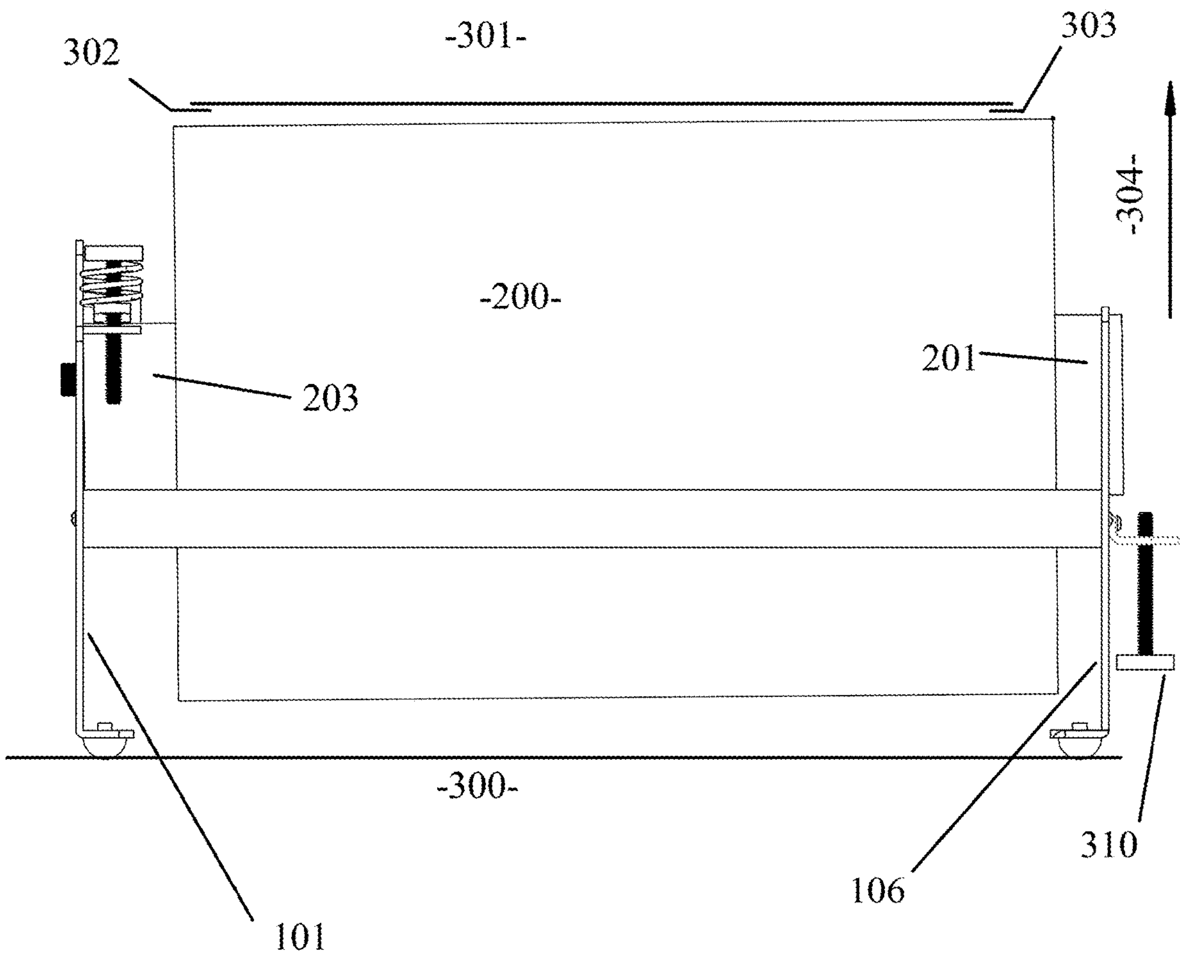
FIG. 3 is a side view of the dispensing and expanding apparatus, the tensioning device, and the paper roll loaded on the dispensing and expanding apparatus.

FIG. 2 is a perspective view of the tensioning system loaded with paper roll 200. As shown in FIGS. 2 and 3, paper core 204 end region 201 is resting in the yoke region 107 and positioning member 208 is a bent metal member attached to side fixture 106.

FIG. 3 is the front view of the alternative angled design where paper roll 200 is at a slight angle as compared to a horizontal table surface as indicated by line 300. The orientation relationship is illustrated by means of the horizontal line 301 that is parallel to horizontal line 300. The space 303 between paper roll 200 and horizontal orientation line 301 is smaller than space 302. This relationship is achieved by having the bottom of the yoke area 107, of FIG. 1, higher than the bottom of the core end 203 as positioned on the support bar 102 of FIG. 1. Line 300 depicts the horizontal table top while support bar 102 of fixture 101 positions the paper core end 203 lower than the position of the core end 201 on the yoke 107. Arrow 304 depicts yoke 106 being higher than fixture 101 creating the angling of the paper roll 200 relative to the horizontal table top.

Figure 4:
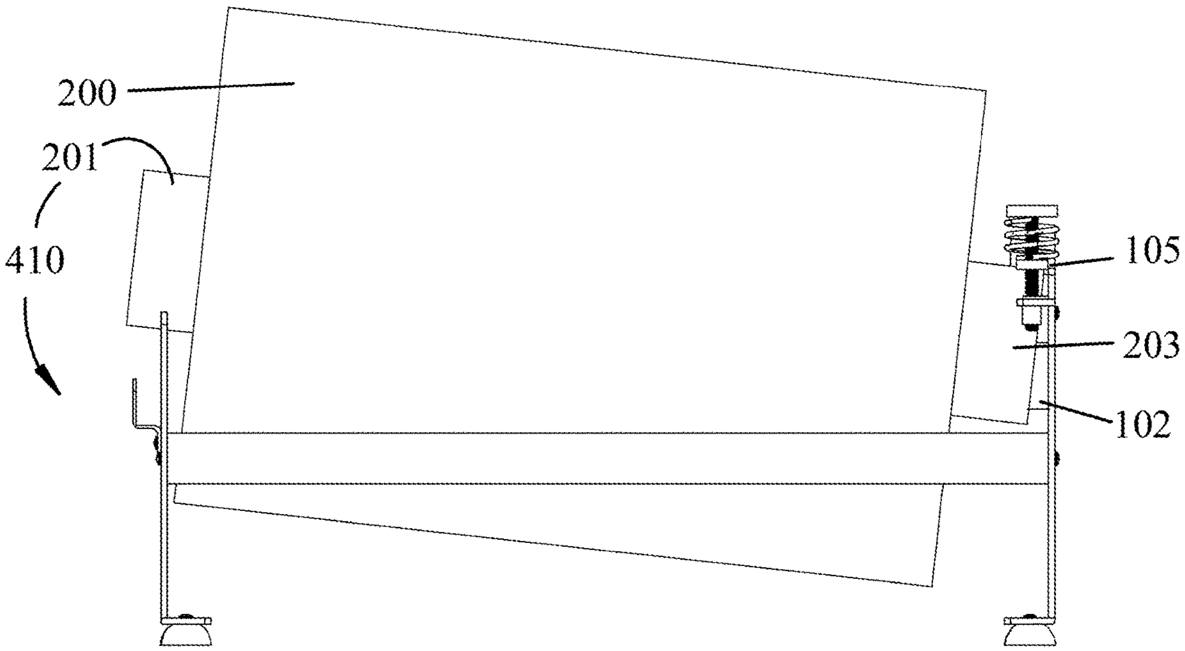
FIG. 4 is a perspective view of the tensioning device with the paper roll positioned at an angle with respect to the dispensing and expanding apparatus, for loading the paper roll on the dispensing and expanding apparatus.
Figure 6:
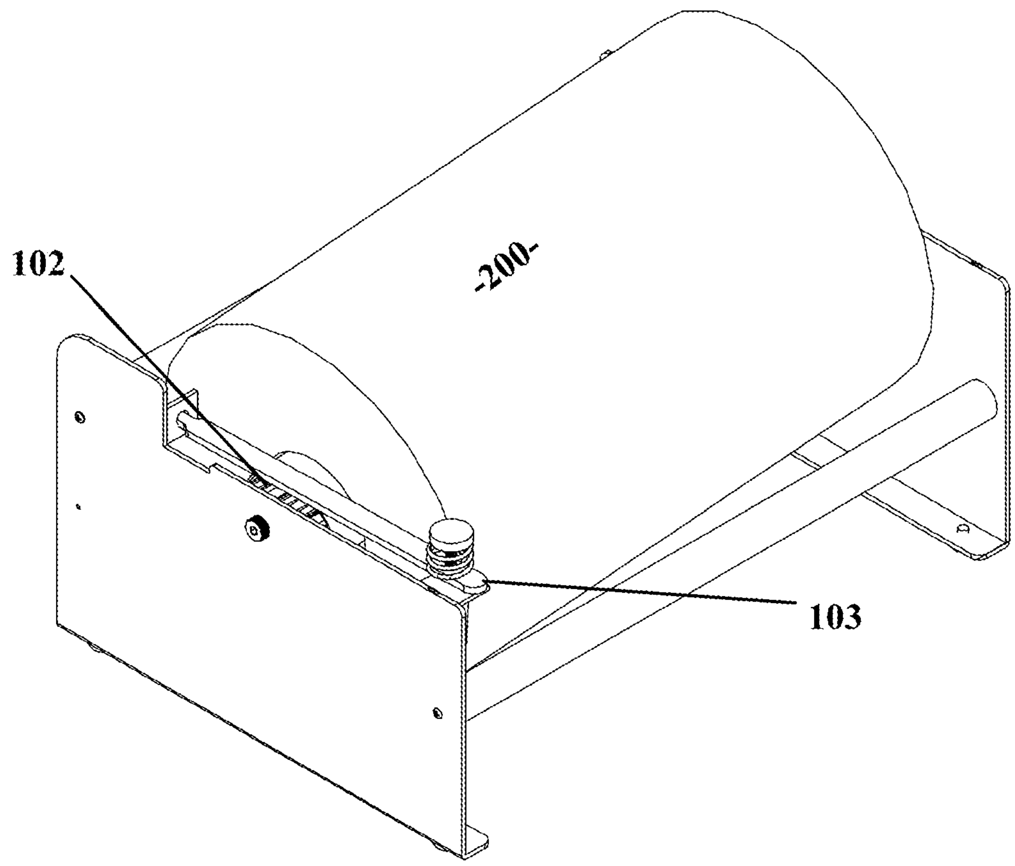
FIG. 6 is a perspective view of the dispensing and expanding apparatus of FIG. 4.

As shown in FIGS. 1, 4, and 6, the yoke 102 is in the form of a support bar positioned interior of the paper core end 203 and thus not shown in FIG. 3. The cylindrical paper core member 204 is suspended, that is supported, at its exterior end regions 201 and 203 from the yoke region 107 of frame 106 and the support bar 102, respectively.

As shown in FIG. 1, a thumbscrew 108 can be threaded upward in direction of paper core end region 201 to stop the lateral movement of paper core end region 203 away from the support bar 102 and fixture 101.

As shown in FIG. 3, in addition to, or as an alternative to the use of a thumbscrew to lock the paper in position is to have the yoke region 107 positioned upward relative to the core support 102, to provide a slightly angled paper roll and use gravity to keep the paper against the tension side of the device. The angling of the paper roll 200 biases the paper roll toward the tension member 103 and the fixture 101. Once the tensioning device is firmly in position and the paper is mounted, it will function in as described in nonprovisional Ser. No. 15/428,144. Once the paper roll is mounted a thumbscrew 310, located on the outer side of the yoke, can be screwed upward to avoid the paper from sliding outward and away from the tensioning side of the device.

FIG. 4 illustrates the method of mounting the paper roll 200 on the tensioning and dispensing system 100. The paper roll is positioned at an angle with respect to the dispensing and expanding apparatus, for loading the paper roll on the dispensing and expanding apparatus. The core support member 102 as shown in FIGS. 1, 3, and 6, is inserted into the hollow cylindrical core member 204, paper core end 203 and the paper core end region 201 is lowered into its position in the yoke region 107 of fixture 101 by rotating the roll 200 on the core support 102 as indicated by curve arrow 410.

Figure 5:
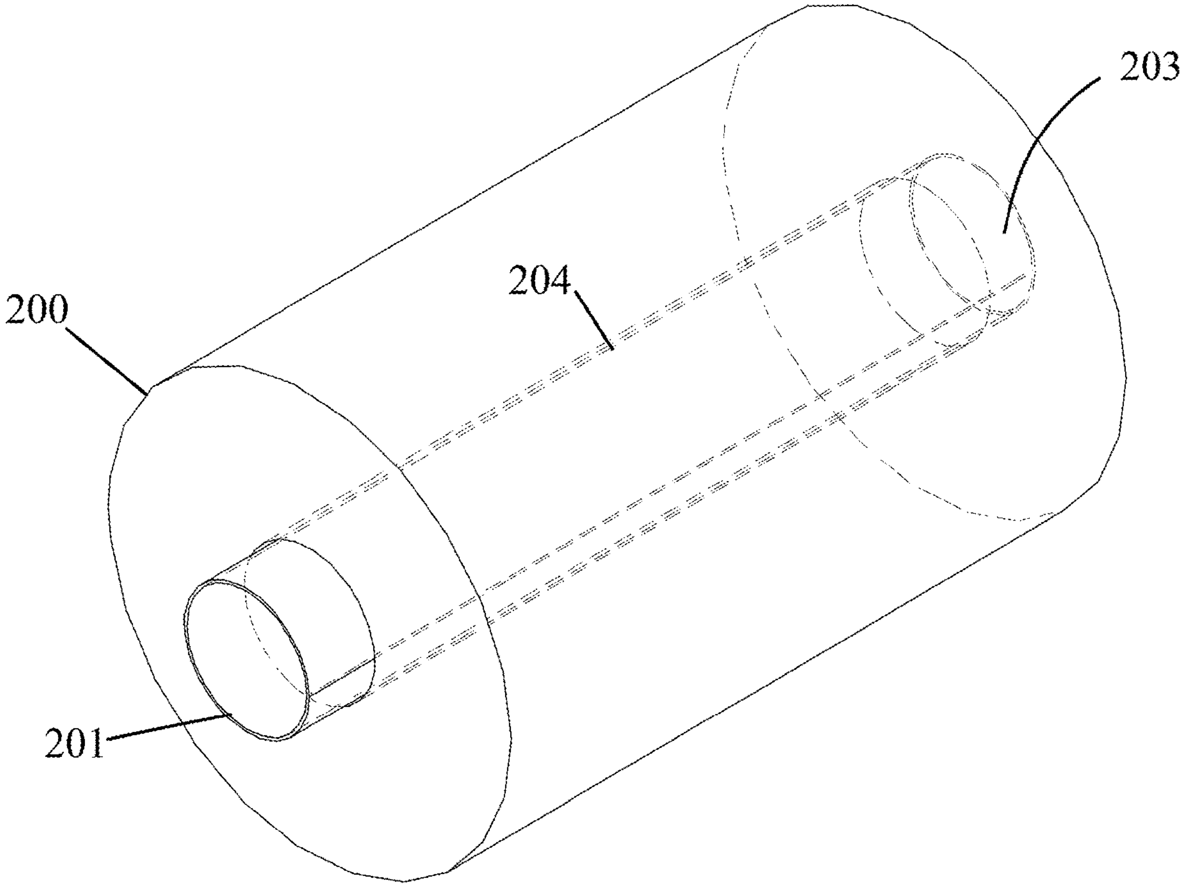
FIG. 5 is a perspective view of the paper roll wound on a hollow core member.

FIG. 5 is a perspective view of the paper roll 200 showing the hollow interior core member 204. The length of the interior core 204 is longer than the width of the paper roll 200 and thus has two exterior ends 201 and 203 that extend beyond the ends of the paper roll 200. The exterior end 203 provides a friction surface and, in combination with the tension member 103 functions to resist the drawing of slit paper from the paper roll 200. The core member 204 can be of any rigid material such as metal or plastic, but paper is highly preferred.

FIG. 6 is a perspective view of the dispensing and expanding apparatus of FIG. 3. As shown in FIG. 3 the support bar 102 of fixture 101 positions the paper core end 203 lower than the position of the core end 201 on the yoke 107. The yoke of fixture 106 supports the core end 201 at a higher position than core support 102 supports the core member 204 thus creating the angling of the paper roll 200 relative to the horizontal table top.

Figure 7:
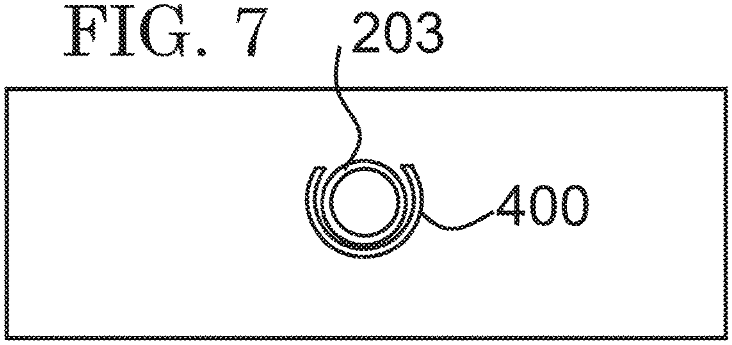
FIG. 7 is a fragmentary end view of an elongated interior core member mounted in a core support member.

FIG. 7 is a fragmentary end view of an elongated interior core member 201 mounted in a core support member 400. The first core support member 400 has a radius greater than the radius of the first interior core member 203 and an arc that provides an open region that is sufficient for a friction means such as shown in FIG. 7 to contact the surface of the first interior core member end region 203. The radius of the first core support member is sufficiently greater than the radius of the first interior core member in order to enable the first interior core member to be inserted into the first core support member.

Figure 8:
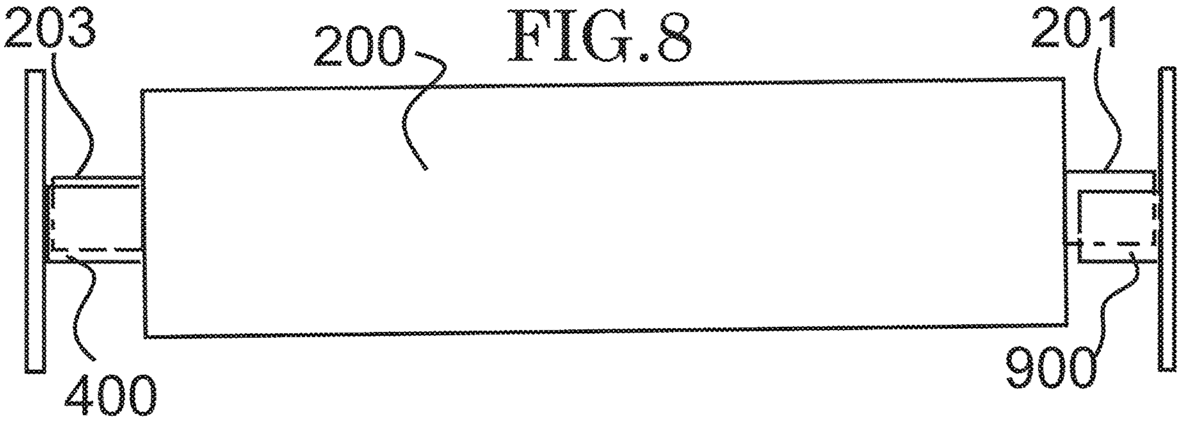
FIG. 8 is a side view of a dispensing and expanding apparatus with a paper roll having the ends of its elongated interior core member mounted in core support members.

FIG. 8 is a side view of a dispensing and expanding apparatus with a paper roll having the ends of its elongated interior core member mounted in core support members. The arc of the core support member 400 is less than about 300° and preferably no greater than 240° in order to enable the tension rod 103 to contact the first interior core member 203's outer surface.

Figure 9:
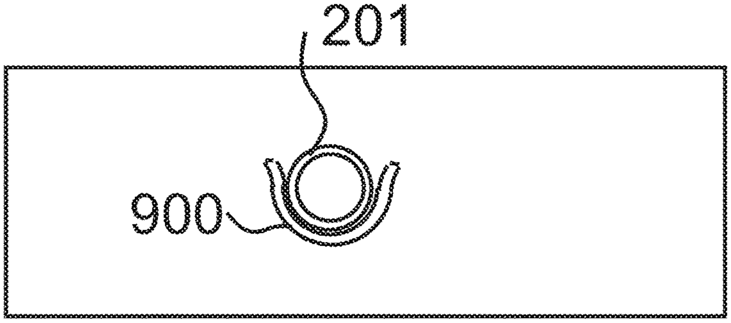
FIG. 9 is a fragmentary end view of an alternate embodiment of an elongated interior core member mounted in a core support member.

Preferably the second core support member 900 has a first surface in contact with the surface of the second interior core member end region 201 and has an arcuate configuration as shown in FIG. 9. Advantageously, the arcuate configuration has a curvature that cooperates with the curvature of the outer surface of the second interior core member end region. The second core support member 900 outer surface has a radius greater than the radius of the second interior core member and preferably an arc of less than 180°. Most preferably, the arcuate configuration has an arc of between 180° and 110°. In embodiments in which the second core support member 900 has an arcuate configuration of no greater than about 180°, the second interior core member 201 can be lifted off the second core support member 400 and the roll of expandable slit sheet paper rotated about the first core support member 900 and separated from the expanding and dispensing apparatus. Similarly, the paper roll can be positioned in the expander-dispenser inserting the first interior core member 203 in the support member. The roll of expandable slit sheet paper 200 is rotated about the first core support 400 and the second interior core member 203 is dropped onto the core support member 900. The paper roll 200 is then in a position to be drawn from the expanding and dispensing apparatus.

The use of individual numerical values is stated as approximations as though the values were preceded by the word "about", "substantially", or "approximately." Similarly, the numerical values in the various ranges specified in this application, unless expressly indicated otherwise, are stated as approximations as though the minimum and maximum values within the stated ranges were both preceded by the word "about", "substantially", or "approximately." In this manner, variations above and below the stated ranges can be used to achieve substantially the same results as values within the ranges. As used herein, the terms "about", "substantially", and "approximately" when referring to a numerical value shall have their plain and ordinary meanings to a person of ordinary skill in the art to which the disclosed subject matter is most closely related or the art relevant to the range or element at issue. The amount of broadening from the strict numerical boundary depends upon many factors. For example, some of the factors which may be considered include the criticality of the element and/or the effect a given amount of variation will have on the performance of the claimed subject matter, as well as other considerations known to those of skill in the art. As used herein, the use of differing amounts of significant digits for different numerical values is not meant to limit how the use of the words "about", "substantially", or "approximately" will serve to broaden a particular numerical value or range. Thus, as a general matter, "about", "substantially", or "approximately" broaden the numerical value. Also, the disclosure of ranges is intended as a continuous range including every value between the minimum and maximum values plus the broadening of the range afforded by the use of the term "about", "substantially", or "approximately". Thus, recitation of ranges of values herein are merely intended to serve as a shorthand method of referring individually to each separate value falling within the range, unless otherwise indicated herein, and each separate value is incorporated into the specification as if it were individually recited herein. To the extent that determining a given amount of variation of some the factors such as the criticality of the slit patterns, paper width differential pre- and post-expansion, paper weights and type, as well as other considerations known to those of skill in the art to which the disclosed subject matter is most closely related or the art relevant to the range or element at issue will have on the performance of the claimed subject matter, is not considered to be within the ability of one of ordinary skill in the art, or is not explicitly stated in the claims, then the terms "about", "substantially", and "approximately" should be understood to mean the numerical value, plus or minus 15%.

It is to be understood that any ranges, ratios and ranges of ratios that can be formed by, or derived from, any of the data disclosed herein represent further embodiments of the present disclosure and are included as part of the disclosure as though they were explicitly set forth. This includes ranges that can be formed that do or do not include a finite upper and/or lower boundary. Accordingly, a person of ordinary skill in the art most closely related to a particular range, ratio or range of ratios will appreciate that such values are unambiguously derivable from the data presented herein.

What is claimed is:

1. A device for expanding and dispensing expandable slit sheet paper, comprising:

a roll of expandable slit sheet paper, said roll of expandable slit sheet paper having an interior core member, said roll of expandable slit sheet paper being wound on said interior core member, said interior core member having at least a first interior core member end region that extends beyond said roll of expandable slit sheet paper, a first pressing member configured to press against an outer peripheral surface of said first interior core member end region and apply a frictional rotation resistance to said first interior core member end region, manually rotatable threads arranged for manual adjustment of a position of said first pressing member, whereby manually adjusting a pressure against the outer peripheral surface of said first interior core member end region, and wherein said first pressing member includes an elongated member coupled to a support member and positioned to move towards and away from the outer peripheral surface of said first interior core member end region.

2. The device of claim 1, further comprising:

said interior core member having a second interior core member end region that protrudes beyond said roll of expandable slit paper, and wherein said first interior core member end region is supported by a first core support member and said second interior core member end region is supported by a second core support member.

3. The device of claim 2, wherein:

said first interior core member end region protrudes beyond said roll of expandable slit sheet paper and is mounted on said first core support member, and said second interior core member end region protrudes beyond said roll of expandable slit sheet paper and is mounted on said second core support member.

4. The device of claim 2, further comprising said interior core member being hollow.

5. The device of claim 2, further comprising said interior core member being a hollow paper core.

6. The device of claim 2, wherein:

said first interior core member end region of said interior core member is circular, protrudes beyond said roll of expandable slit sheet paper, and said first pressing member presses against a circular peripheral surface of said first interior core member end region of said interior core member.

7. The device of any one of claim 1 or 2, wherein said elongated member is hinged to said support member.

8. The device of any one of claim 1 or 2, wherein said elongated member is a plate member having a planar surface that is positioned to variably contact said first interior core member end region.

9. The device of claim 8, wherein said plate member is made of metal.

10. The device of claim 8, wherein said elongated member has a through-hole that receives a tension adjustment screw.

11. The device of claim 2, wherein:

said support member is a first wall that supports said first core support member.

12. The device of claim 11, further including a second wall that supports said second core support member.

13. The device of claim 12, wherein said first wall and said second wall are connected together in a spaced relationship via a connecting member.

14. The device of claim 1, further comprising a spring, said spring being arranged to press said elongated member against said outer peripheral surface of said first interior core member end region.

15. The device of claim 14, wherein rotation of said threads in a first direction compresses the spring and increases friction pressure by said elongated member against said outer peripheral surface of said first interior core member end region and rotation of said threads in a second direction decreases friction pressure by said elongated member against said outer peripheral surface of said first interior core member end region.

16. The device of claim 1, further comprising said first interior core member end region that extends beyond an end of said roll of expandable slit sheet paper extending by an amount of at least one inch from said roll of slit sheet paper.

17. The device of claim 16, further comprising a second interior core member end region of said interior core member extending beyond the width of said roll of slit sheet paper by an amount of at least one inch from said roll of slit sheet paper.

18. The device of claim 17, further comprising each end region of said interior core member extending beyond the width of said roll of slit sheet paper by an amount of at least about one and one half inches from said roll of slit sheet paper.

19. A device for expanding and dispensing expandable slit sheet paper, comprising:

a roll of expandable slit sheet paper, said roll of expandable slit sheet paper having an interior core member, said roll of expandable slit sheet paper being wound on said interior core member, said interior core member having at least a first interior core member end region that extends beyond said roll of expandable slit sheet paper, a first pressing member configured to press against an outer peripheral surface of said first interior core member end region and apply a frictional rotation resistance to said first interior core member end region, manually rotatable threads arranged for manual adjustment of a position of said first pressing member, whereby manually adjusting a pressure against the outer peripheral surface of said first interior core member end region, and a spring arranged to apply a spring load upon said first pressing member.

20. The device of claim 19, wherein said spring applies said spring load between said first pressing member and said first interior core member end region.

21. The device of any one of claim 1 or 19, wherein said interior core member is made of a rigid material.

22. The device of claim 21, wherein said interior core member is made of paper.

23. The device of any one of claim 1 or 19, further including a support bar extending laterally from said support member and positioned to support said first interior core member end region.

24. The device of claim 23, wherein said support member is a side wall, and wherein said support bar is attached to said side wall.

25. The device of any one of claim 1 or 19, wherein said support member includes a positioning member positioned to stop lateral movement of said core member.

26. The device of claim 25, wherein said positioning member is a plate member.

27. The device of claim 25, wherein said positioning member is a sheet metal member.

28. The device of any one of claim 1 or 19, wherein said support member includes a curved supporting surface configured to contact said outer peripheral surface of said first interior core member end region.

29. The device of claim 19, wherein rotation of said threads in a first direction compresses the spring and increases friction pressure by said pressing member against said outer peripheral surface of said first interior core member end region and rotation of said threads in a second direction decreases friction pressure by said pressing member against said outer peripheral surface of said first interior core member end region.

30. A device for expanding and dispensing expandable slit sheet paper, comprising:

a roll of expandable slit sheet paper, said roll of expandable slit sheet paper having an interior core member, said roll of expandable slit sheet paper being wound on said interior core member, said interior core member having at least a first interior core member end region that extends beyond said roll of expandable slit sheet paper, a first pressing member configured to press against an outer peripheral surface of said first interior core member end region and apply a frictional rotation resistance to said first interior core member end region, manually rotatable threads arranged for manual adjustment of a position of said first pressing member, whereby manually adjusting a pressure against the outer peripheral surface of said first interior core member end region, wherein said first interior core member end region of said interior core member is substantially circular, protrudes beyond said roll of expandable slit sheet paper, and said first pressing member presses against a substantially circular peripheral surface of said first interior core member end region, and further including a spring arranged to apply a spring load upon said first pressing member, wherein said spring applies said spring load between said first pressing member and said first interior core member end region.

31. The device of claim 30, wherein said interior core member is a paper core member.

32. A method of using the device of claim 3, comprising:

a) resting said first interior core member end region of said interior core member that protrudes beyond said roll of expandable slit sheet paper upon said first core support member, and b) resting said second interior core member end region of said interior core member that protrudes beyond said roll of expandable slit sheet paper upon said second core support member.

33. The method of claim 32, further including:

downwardly lowering said first interior core member end region of said interior core member that protrudes beyond said roll of expandable slit sheet paper to said first core support member.

34. The method of claim 32 or 33, further including:

downwardly lowering said second interior core member end region of said interior core member that protrudes beyond said roll of expandable slit sheet paper to said second core support member.

* * * * *